May 18, 1943. D. B. DREESE 2,319,588
TRUCK LOADER AND UNLOADER
Filed Feb. 24, 1942 2 Sheets-Sheet 1
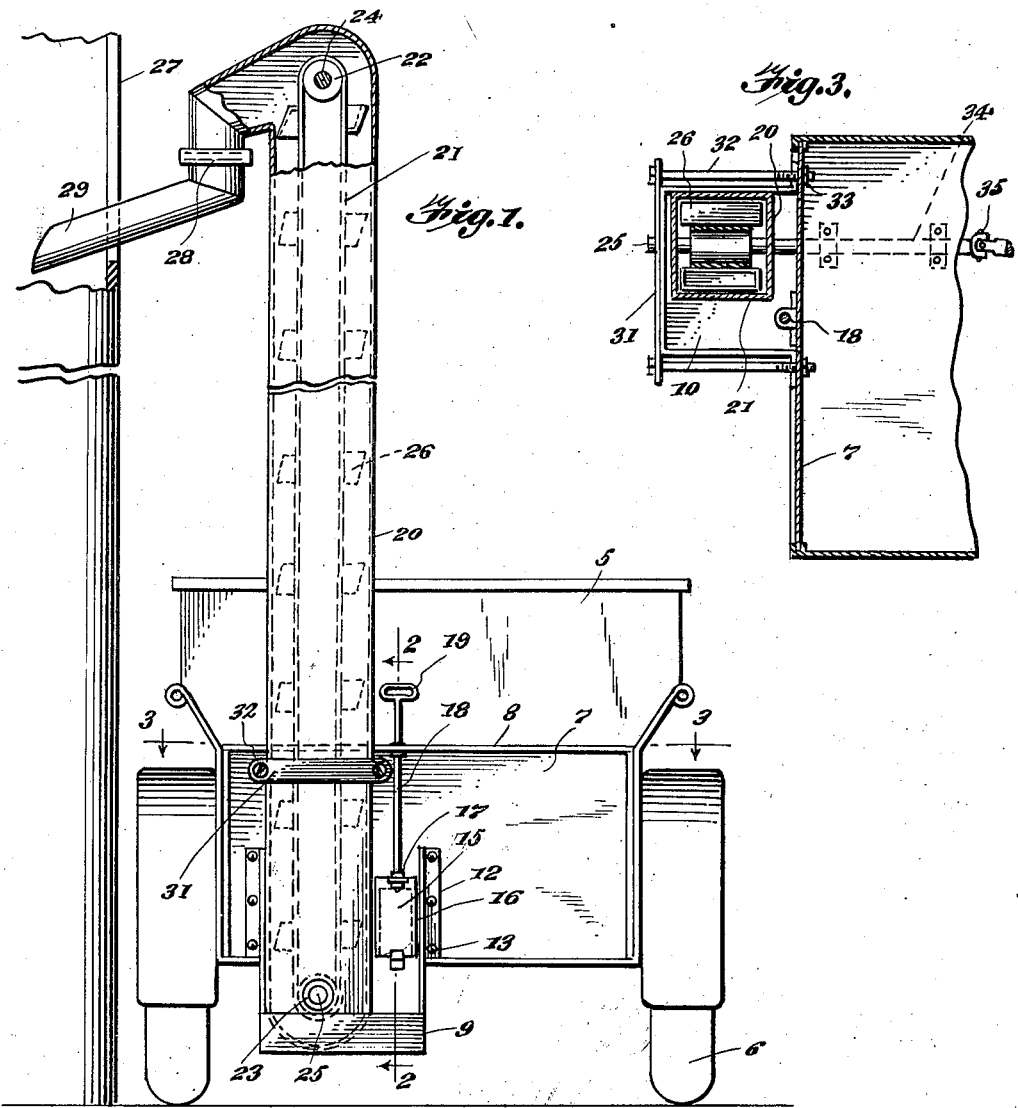
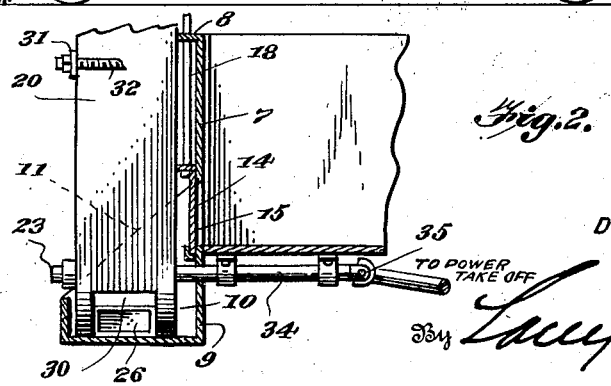
Inventor
DELBERT B. DREESE
By Lacey & Lacey
Attorneys May 18, 1943.  D. B. DREESE  2,319,588
TRUCK LOADER AND UNLOADER
Filed Feb. 24, 1942   2 Sheets-Sheet 2
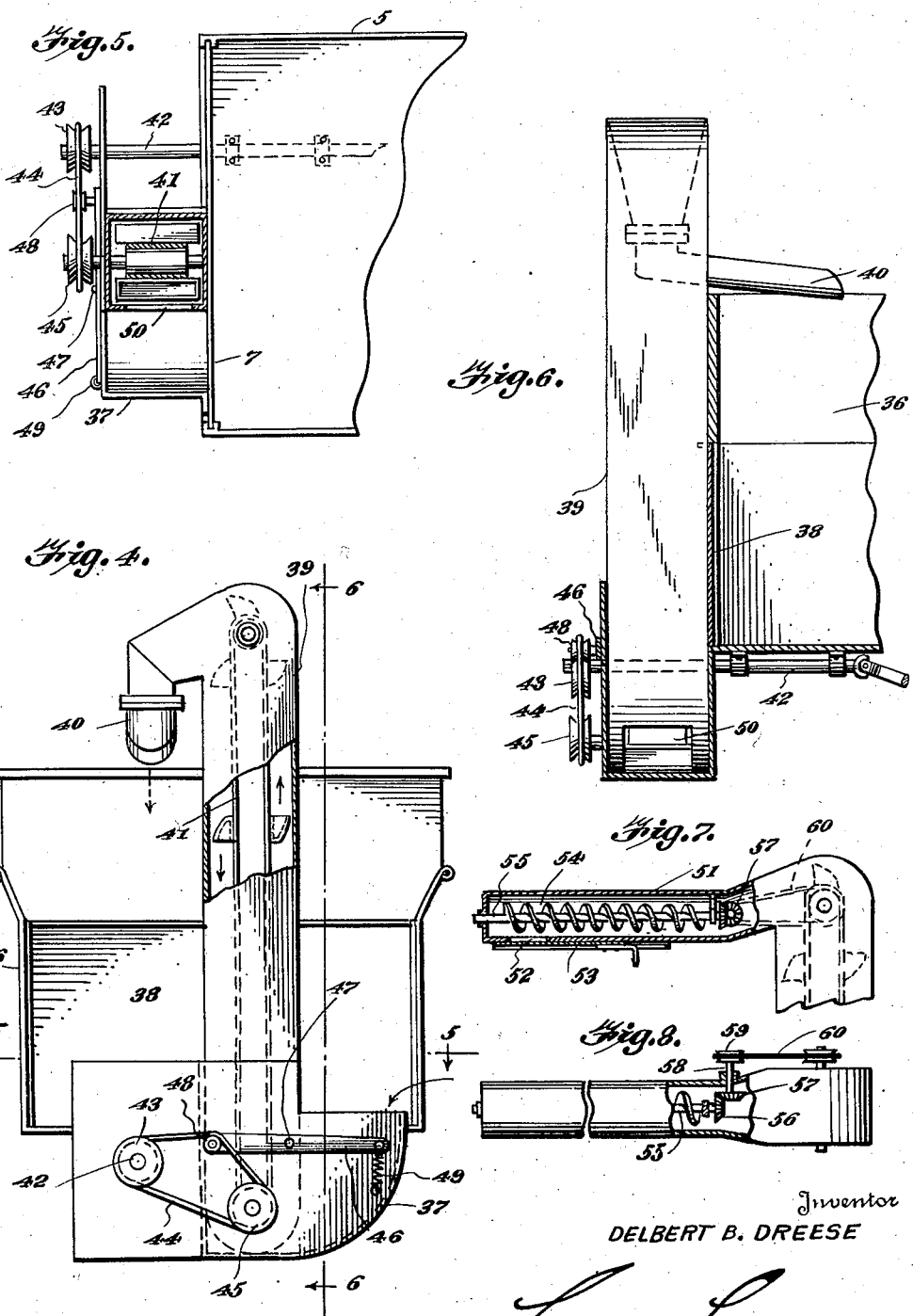
Inventor
DELBERT B. DREESE
By Lacey & Lacey
Attorneys Patented May 18, 1943

2,319,588

UNITED STATES PATENT OFFICE 2,319,588

TRUCK LOADER AND UNLOADER

Delbert B. Dreese, Larned, Kans.

Application February 24, 1942, Serial No. 432,122

5 Claims. (Cl. 214—83)

This invention relates to loading and unloading devices and has for its object to provide a comparatively simple and thoroughly efficient device of this character by means of which wheat, barley and other grain may be unloaded from a truck into a storage bin or the grain loaded into a truck or other vehicle for delivery to said storage bin.

A further object of the invention is to provide a loading and unloading device comprising an attaching plate adapted to fit the discharge end of a truck after the usual end gate is removed, said attaching plate being provided with a hopper for receiving grain from the truck and a vertical elevator for conveying the grain into a storage bin.

A further object is to provide a loading and unloading device, the conveyor of which is operable from the power take-off of the truck and controlled from the driver's seat.

A further object is to provide a device that can be attached to either the end or side of a truck and used for loading the truck with grain preparatory to transferring the grain to a storage bin.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a front elevation of a loading and unloading device embodying the present invention showing the same attached to the end of a truck and in position to deliver grain into a storage bin, Figure 2 is a vertical sectional view taken on the line 2—2 of Figure 1, Figure 3 is a horizontal sectional view taken on the line 3—3 of Figure 1, Figure 4 is a front elevation showing the device used for loading grain into a truck, Figure 5 is a transverse sectional view taken on the line 5—5 of Figure 4, Figure 6 is a vertical sectional view taken on the line 6—6 of Figure 4, Figure 7 is a longitudinal sectional view partly in elevation showing an extension delivery tube for attachment to the upper end of the elevator, and Figure 8 is a top plan view of the same, portions being broken away to show the interior construction thereof.

The improved loading and unloading device forming the subject-matter of the present invention may be used either for loading grain into a truck or for transferring the grain from the truck into a storage bin, and in Figure 1 of the drawings the mechanism is shown applied to a truck of standard construction in which 5 designates the body of the vehicle and 6 the traction wheels.

The device comprises an attaching plate 7 adapted to be positioned at the end of the body of the truck after the usual end gate has been removed, said plate forming a closure for the rear end of the truck and having its upper end bent laterally to form an overhanging horizontally disposed flange 8. Depending from the attaching plate 7 is a grain receiving hopper 9 having a relatively shallow chamber 10 at the bottom thereof and provided with upwardly and rearwardly inclined side walls 11 terminating in attaching flanges 12 adapted to receive bolts or similar fastening devices 13 for securing the hopper to the outer face of said attaching plate. The lower portion of the attaching plate is provided with an opening 14 through which grain may be fed from the body of the truck into the receiving hopper 9 for delivery to a storage bin.

As a means for controlling the flow of grain through the opening 14, there is provided a cut-off plate 15 slidably mounted in suitable guides 16. Swiveled at 17 in the upper end of the cut-off plate 15 is a threaded adjusting rod 18 which extends through a correspondingly threaded opening in the reinforcing flange 8 and is provided with a terminal operating handle 19 by rotating which the cut-off plate may be adjusted vertically, as will be readily understood.

Disposed within the chamber 10 and resting on the bottom thereof is an upright casing 20 of any desired height which serves to house and protect an endless belt or conveyor 21. The belt 21 is trained about upper and lower pulleys 22 and 23 carried by stub shafts 24 and 25, the upper stub shaft 24 being journaled in the walls of the casing 20 and the lower stub shaft 25 having one end thereof journaled in the casing and its other end in the rear wall of the hopper 9.

The belt 22 is provided with a series of cups or buckets 26 so that grain passing through the opening 14 from the body of the truck into the hopper will be carried upwardly by the buckets 26 and deposited into a storage bin, indicated at 27.

Connected with the upper portion of the casing 20 by a swiveled joint 28 is a discharge pipe or tube 29 through which the grain is discharged into the storage bin, there being an opening 30 formed in the lower end of the casing 20 and communicating with the chamber 10 for feeding grain from the hopper into the cups or buckets 26. The casing 20 is secured in position on the attaching plate 7 by means of a transverse bar 31, the opposite ends of which are threaded for the reception of bolts 32, which bolts extend through openings in the attaching plate and are provided with clamping nuts 33, as best shown in Figure 3 of the drawings.

The lower stub shaft 23 is formed with an extension 34 and is connected through the medium of a universal joint 35 with the power take-off of the truck so that by operating the clutch adjacent the driver's seat motion may be transmitted from the power take-off device to the conveyor for unloading the truck and delivering the grain into the storage bin.

In Figures 4 to 6 inclusive of the drawings, there is illustrated a modified form of the invention, in which the device is used for loading grain into a truck, indicated at 36. In this form of the device the hopper 37 is fastened to an attaching plate 38 or, if desired, directly to the usual end gate and extending upwardly from said hopper is a casing 39 having a discharge spout 40 for delivering grain into the body of the truck by means of an elevator 41. When the device is used in this manner, a stub shaft 42 is journaled in one wall of the hopper and operatively connected with the power take-off of the truck, said shaft having a V-shaped pulley 43 secured thereto and over which extends a belt 44 which, in turn, engages a pulley 45 operatively connected with the conveyor 41 so that power from the take-off device will be transmitted through the V-shaped pulley 43 to the pulley 45 thereby to rotate the conveyor and transfer the grain from the hopper 37 into the body of the truck for future delivery to the grain bin.

As a means for maintaining the belt 44 under tension, there is provided a belt tightener comprising a lever 46 pivotally mounted at 47 on the hopper and having one end thereof provided with an idle pulley 48 and its other end connected with the hopper by means of a spring 49. It will thus be seen that grain from a threshing machine or other suitable source of supply when fed into the hopper 37 will be carried upwardly by the conveyor 41 and delivered into the body of the truck. It will, of course, be understood that the lower wall of the casing 39 will be provided with a feed opening 50 similar in construction to the feed opening shown in Figure 1 of the drawings to allow the grain within the hopper to be carried upwardly by the buckets on the conveyor.

In order to insure a uniform disposition of the grain within the storage bin or body of the truck, the upper end of the conveyor casing may be provided with a tubular extension 51 of any desired length, said extension being provided on one side thereof with an opening 52 through which the grain is discharged, the amount of grain discharged through the opening being controlled by a cut-off plate 53, as best shown in Figure 7 of the drawings. When the extension 51 is relatively long, there is preferably provided a feed auger 54, the spirals of which are connected to a shaft 55 journaled within said extension. The inner end of the shaft 55 is provided with a beveled gear 56 which meshes with a correspondingly beveled gear 57 mounted on a stub shaft 58. The stub shaft 58 is provided with a pulley 59 over which extends a belt 60 leading to a pulley on the upper portion of the conveyor 41 so that, as the conveyor 41 rotates, motion will be transmitted to the auger for feeding the grain longitudinally of the extension and thence outwardly through the discharge opening therein.

From the foregoing description, it is thought that the construction and operation of the device will be readily understood by those skilled in the art and further description thereof is deemed unnecessary.

Having thus described the invention, what is claimed as new is:

1. The combination with a motor driven truck, of an attaching plate secured to the discharge end of the truck and forming an end gate therefor, said attaching plate having its upper end provided with a lateral reinforcing flange formed with a guide aperture and its lower end formed with an opening communicating with the interior of the truck, a hopper secured to the attaching plate at said opening, a casing extending vertically of the truck and having its lower end fitted within the hopper and provided with an opening communicating therewith, a conveyor mounted for rotation within the casing, and a cut off valve for controlling the flow of material from the interior of the truck into said hopper and provided with an operating rod extending through the aperture in the flange.

2. The combination with a motor driven truck, of an attaching plate secured to the discharge end of the truck and constituting an end gate, said plate being provided with an opening communicating with the interior of the truck, a hopper secured to said plate at said opening and provided with a shallow chamber and side walls having lateral flanges attached to the plate, a casing disposed within the hopper, a conveyor operating within the casing, a discharge pipe secured to the upper end of the casing, and a valve for controlling the flow of material through said opening.

3. The combination with a motor driven truck, of an attaching plate forming the end gate of the truck and having its upper portion provided with a laterally extending flange and its lower portion formed with an opening communicating with the interior of the truck, a hopper detachably secured to said plate, a casing fitting within the hopper and communicating therewith, means for detachably securing the casing to the attaching plate, a conveyor mounted for rotation within the casing, a cut-off plate slidably mounted on the attaching plate within the hopper for controlling the flow of material through said opening, and an adjusting rod connected with the cut off plate and operating through an aperture in said flange.

4. The combination with a motor driven truck, of an attaching plate secured to the discharge end of the truck and provided with an opening communicating with the interior of the truck, a hopper carried by the attaching plate, a vertically disposed casing fitted within the hopper, upper and lower stub shafts journaled in the casing and provided with pulleys, an endless conveyor trained around said pulleys, said lower stub shaft having its inner end provided with means for connection with the power plant of the truck, and a cut-off plate slidably mounted on the attaching plate between one wall of the hopper and the adjacent wall of the casing for controlling the flow of material through said opening into the hopper.

5. The combination with a motor driven truck, of an attaching plate secured to the discharge end of the truck and constituting an end gate, a hopper carried by the attaching plate, said plate being provided with an opening forming a source of communication between the hopper and interior of the truck, a casing extending vertically of the rear end of the truck and having its lower end fitted within the hopper, a clamping bar for detachably securing the casing to the attaching plate, an elevator mounted for rotation within the casing, and means slidably mounted on the attaching plate between one wall of the hopper and the adjacent wall of the casing for controlling the flow of material through said opening.

DELBERT B. DREESE.